(12) United States Patent
Poechmueller et al.

(10) Patent No.: US 9,994,223 B2
(45) Date of Patent: Jun. 12, 2018

(54) METHOD AND DEVICE FOR OPERATING A VEHICLE

(71) Applicant: Robert Bosch GmbH, Stuttgart (DE)

(72) Inventors: Werner Poechmueller, Hildesheim (DE); Volkmar Denner, Pfullingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days. days.

(21) Appl. No.: 14/418,580

(22) PCT Filed: Jul. 18, 2013

(86) PCT No.: PCT/EP2013/065192
§ 371 (c)(1),
(2) Date: Jan. 30, 2015

(87) PCT Pub. No.: WO2014/019866
PCT Pub. Date: Feb. 6, 2014

(65) Prior Publication Data
US 2015/0298699 A1    Oct. 22, 2015

(30) Foreign Application Priority Data

Jul. 30, 2012   (DE) ........................ 10 2012 213 321

(51) Int. Cl.
*G01C 22/00*    (2006.01)
*G05D 1/00*     (2006.01)
(Continued)

(52) U.S. Cl.
CPC ......... *B60W 30/18072* (2013.01); *B60Q 9/00* (2013.01); *B60W 10/02* (2013.01);
(Continued)

(58) Field of Classification Search
CPC .. B60W 50/0097; B60W 50/16; B60W 10/02;
B60W 10/06; B60W 10/08;
(Continued)

(56) References Cited

U.S. PATENT DOCUMENTS 9,174,635 B2 * 11/2015 Boot .................. B60K 6/48
2004/0068359 A1    4/2004 Neiss et al.

FOREIGN PATENT DOCUMENTS

DE      1020060547327        5/2008
DE       102007018733       10/2008
(Continued)

OTHER PUBLICATIONS

International Search Report for PCT/EP2013/065192, dated Oct. 16, 2013.

*Primary Examiner* — Maceeh Anwari
(74) *Attorney, Agent, or Firm* — Norton Rose Fulbright US LLP; Gerard Messina (57) ABSTRACT

A method is provided for operating a vehicle, wherein during coasting of the vehicle, in order to reach a route position of a driving route that is still to be travelled, at a desired speed that is less than a vehicle speed at the start of coasting, a vehicle actual speed is compared with a vehicle target speed and an action is performed in dependence on the comparison. This renders possible a continuous adaptation of the driving resistance, so the desired speed is reliably reached. Interfering variables such as wind or gradient may be compensated for. A device is provided for operating a vehicle, and to a computer program.

8 Claims, 3 Drawing Sheets

(51) Int. Cl.
    *B60W 30/18*  (2012.01)
    *B60W 50/00*  (2006.01)
    *B60W 50/14*  (2012.01)
    *B60W 50/16*  (2012.01)
    *B60W 10/02*  (2006.01)
    *B60W 10/06*  (2006.01)
    *B60W 10/08*  (2006.01)
    *B60W 10/11*  (2012.01)
    *B60W 30/14*  (2006.01)
    *B60Q 9/00*  (2006.01)
    *G01C 21/26*  (2006.01)

(52) U.S. Cl.
    CPC ............ *B60W 10/06* (2013.01); *B60W 10/08* (2013.01); *B60W 10/11* (2013.01); *B60W 30/143* (2013.01); *B60W 50/0097* (2013.01); *B60W 50/14* (2013.01); *B60W 50/16* (2013.01); *G01C 21/26* (2013.01); *B60W 2050/146* (2013.01); *B60W 2550/143* (2013.01); *B60W 2550/22* (2013.01); *B60W 2550/402* (2013.01); *B60W 2720/103* (2013.01); *Y02T 10/76* (2013.01)

(58) Field of Classification Search
    CPC ............... B60W 10/11; B60W 30/143; B60W 30/18072; B60W 50/14; G01C 21/26; B60Q 9/00
    USPC .......................................................... 701/25
    See application file for complete search history.

(56) References Cited

FOREIGN PATENT DOCUMENTS

| | | | |
|---|---|---|---|
| DE | 102010026769 | | 4/2011 |
| DE | 102011007034 A | * | 4/2011 |
| DE | 102010039642 | | 2/2012 |
| DE | 102010041544 | | 3/2012 |
| DE | 102011007034 | | 10/2012 |
| EP | 2460704 | | 6/2012 |
| GB | 2481121 | | 12/2011 |
| JP | 2007187090 A | * | 7/2007 |

* cited by examiner

METHOD AND DEVICE FOR OPERATING A VEHICLE

FIELD OF THE INVENTION

The present invention relates to a method and a device for operating a vehicle. The present invention further relates to a computer program.

BACKGROUND INFORMATION

British Published Patent Application No. GB 2481121 A discloses a method and a device for controlling a driving behavior of a vehicle when the vehicle is approaching a stopping point. A coasting distance is determined when the vehicle approaches the stopping point. When the coasting distance is reached, a signal is emitted.

SUMMARY

An object underlying the present invention may be regarded as being to indicate a method and a device for operating a vehicle that render possible an improved coasting of the vehicle.

The object underlying the present invention may also be regarded as being to provide a corresponding computer program.

In accordance with one aspect, a method for operating a vehicle is provided. During coasting of the vehicle, in order to reach a route position of a driving route that is still to be travelled, at a desired speed that is less than a vehicle speed at the start of coasting, a vehicle actual speed is compared with a vehicle target speed, an action being performed in dependence on the comparison.

In accordance with another aspect, a device for operating a vehicle is provided. The device includes a comparison device which is configured to compare a vehicle actual speed with a vehicle target speed during coasting of the vehicle in order to reach a route position of a driving route that is still to be travelled, at a desired speed that is less than a vehicle speed at the start of coasting. The device furthermore includes a controller for controlling an action in dependence on the comparison.

In accordance with a further aspect, a computer program is provided which includes program codes for carrying out the method for operating a vehicle when the computer program is executed in a computer.

By comparing a vehicle actual speed with a vehicle target speed during coasting of the vehicle and by performing an action in dependence on the comparison it is advantageously possible to respond appropriately and optimally to possible interference that may have an effect on the vehicle during coasting. The coasting of the vehicle may thus be optimized. In particular, it is possible in that manner to ensure that the vehicle is able to reach the route position at the desired speed despite the interference. Such interference may be, for example, a tail wind or a head wind. Interference may be, for example, an unforeseen ascending gradient or an incline or descending gradient in the course of the route. Interference may be, for example, a road surface with an increased or reduced rolling resistance. Interference may be, for example, unforeseen obstacles such as, for example, other vehicles.

The coasting is therefore monitored to ascertain whether the vehicle will reach the route position at the desired speed. In the related art, it is usually the case that, before the start of coasting, a position is determined at which the coasting is started so that, based on the route conditions or vehicle conditions applying or prevailing at the time when the position is calculated, the vehicle is able to reach the route position at the desired speed. However, after the start of coasting, the known methods do not take into account possible changes in the route conditions and in the vehicle conditions. That means therefore, in particular, that in the known methods it may be that, owing to a head wind, the vehicle will no longer reach the route position at the desired speed, but will reach it at a distinctly lower speed. Conversely, in the related art, in the case of a tail wind during coasting of the vehicle, the route position would be reached at a higher speed than the desired speed.

In the related art, therefore, a single pre-calculation takes place regarding how a vehicle will move when a driver takes his foot off the accelerator pedal, that is to say, no longer asks for driving power. In the related art, the vehicle is subsequently left to itself when coasting.

In contrast, the present invention monitors the coasting for deviations from a pre-calculated coasting curve, it being possible for corrective measures to be initiated accordingly when there are deviations, so that the desired speed, that is to say, the desired target speed at the route position, may be met as precisely as possible.

Coasting in the sense of the present invention refers especially to an operation of the vehicle in which no driving power is required. That means therefore, in particular, that a driver, for example, no longer asks a vehicle driving machine for driving power. In particular, for that purpose he takes his foot off the accelerator pedal or does not actuate the accelerator pedal.

A vehicle target speed in the sense of the present invention refers especially to a target speed of a calculated vehicle target speed curve during the coasting. Such a curve is calculated in particular to determine a start time or a start position at which the coasting begins or starts. That curve may also be referred to as a vehicle target speed coasting curve. That means therefore, in particular, that that curve defines a dependence between distance travelled from the start position and vehicle speed or a dependence between time elapsed from the start time and vehicle speed.

In accordance with one embodiment, the vehicle includes a vehicle driving machine capable of developing or providing a driving force. For example, the driving machine may be an internal combustion engine and/or an electric motor. Preferably, the vehicle includes a transmission device for transmitting the driving force developed by the vehicle driving machine to a vehicle environment for movement of the vehicle. Preferably, the transmission device may include a wheel or a plurality of wheels which transmit the driving force to a road in order to move the vehicle. Such wheels may preferably be referred to as driving wheels. In particular, a propeller and/or a jet may be provided which are able to transmit the driving force to the vehicle environment, in this case air.

In accordance with one embodiment, it may be provided that the vehicle driving machine is capable of being coupled to the transmission device, so that the driving force may be transmitted from the vehicle driving machine to the transmission device and from there to the vehicle environment. That means therefore, in particular, that the vehicle driving machines and the transmission device may be coupled to and also uncoupled from one another. That means therefore, in particular, that it is possible to form an operative connection between the vehicle driving machine and the transmission device, it also being possible for that operative connection to be separated again.

During coasting of the vehicle, especially at the start of coasting, it may be provided in accordance with one embodiment that the vehicle driving machine and the transmission device are uncoupled from one another. Such an uncoupled state may also be referred to as a freewheeling state.

In accordance with one embodiment, it may be provided that, during coasting, especially at the start of coasting, the vehicle driving machine and the transmission device are coupled to one another. In such a coasting phase, the vehicle drags the engine of the vehicle or the vehicle driving machine. This may also be referred to as coasting with an engine drag torque. This may also be referred to, in particular, as an overrun mode which to that extent refers to a driving state of a vehicle in which, with the frictional connection not separated, that is to say, when there is an operative connection between the vehicle driving machine and the transmission device, the vehicle driving machine is dragged, that is to say, in particular, is kept in rotation, by the vehicle.

In accordance with one embodiment, it may be provided that the action includes the issuing of a notification for a corrective measure in order to reach the route position at the desired speed. In that manner, a driver is advantageously put in a position to take and carry out corrective measures accordingly in order to reach the route position at the desired speed, and to do so in particular, when there is interference. The driver therefore retains control over the guidance of the vehicle and is able to decide independently whether he considers it sensible to carry out the corrective measures or not. Preferably, the notification may be an optical notification, an acoustic notification or a haptic notification. Preferably, a plurality of notifications may be provided, which may be formed, in particular, in identical manner or, for example, in different manner. Preferably, a display system including a projector may be provided which projects the notification onto a window pane of the vehicle; in particular, it may be the front windshield of the vehicle that is involved, so that the driver has the notifications projected in his field of vision. An optical notification may be issued, for example, via a display device. As an example of a haptic notification, it may preferably be provided that a driver pedal, especially a clutch pedal, an accelerator pedal or a brake pedal, be acted upon by a pulse. That means therefore, in particular, that the driver pedal is briefly actuated automatically in order in that manner to indicate to the driver haptically via his foot that he has to actuate the driver pedal on his own.

In accordance with one embodiment, it may be provided that the action includes an automatic intervention in a vehicle operation in order to reach the route position at the desired speed. In that manner, the driver is advantageously relieved of carrying out the necessary measures required to reach the route position at the desired speed. He is thereby advantageously able to continue concentrating on the traffic. Vehicle safety is thereby advantageously increased.

In a further embodiment, it may be provided that, when the vehicle actual speed is less than the vehicle target speed, as an automatic intervention the vehicle driving machine and the transmission device for transmitting a driving force developed by the vehicle driving machine to a vehicle environment for movement of the vehicle are uncoupled from one another.

In another embodiment, it may be provided that, when the vehicle actual speed is greater than the vehicle target speed, as an automatic intervention the vehicle driving machine and the transmission device are coupled to one another.

The uncoupling of the vehicle driving machine from the transmission device has the effect, in particular, that a rolling resistance of the vehicle is reduced, so that a vehicle actual speed decreases more slowly/later during the further coasting. It is thus advantageously possible to cause the vehicle actual speed to approach the vehicle target speed from below when the vehicle actual speed is less than the vehicle target speed.

Coupling of the vehicle driving machine to the transmission device has the effect, in particular, that a rolling resistance of the vehicle is increased. This advantageously causes the vehicle actual speed to approach the vehicle target speed from above when the vehicle actual speed is greater than the vehicle target speed.

The two aforementioned features therefore have, in particular, the effect of a simple changing of the deceleration or acceleration depending on whether the vehicle is moving too quickly or too slowly compared with the vehicle target speed.

In accordance with another embodiment, it may be provided that an electric generator is provided which is configured to develop or provide an electrical power, the electric generator being capable of being coupled to a drive train of the vehicle. That means therefore, in particular, that the electric generator may be uncoupled from and coupled to the drive train.

In a further embodiment, it may be provided that, when the vehicle actual speed is less than the vehicle target speed, as an automatic intervention the electrical power developed by the electric generator that is coupled to the drive train of the vehicle is reduced.

In another embodiment, it may be provided that, when the vehicle actual speed is greater than the vehicle target speed, as an automatic intervention the electrical power of the electric generator is increased.

By reducing the electrical power a rolling resistance of the vehicle is advantageously reduced, so that the vehicle actual speed approaches the vehicle target speed from below. In particular, it may be provided that for reducing the electrical power the electric generator is uncoupled or disconnected from the drive train. For example, the electric generator may be switched off. That means therefore, in particular, that the electric generator no longer generates electrical power. The electrical power developed in that case is 0. Preferably, it may be provided that the electric generator is switched to an electric motor mode in which the electric generator is able to provide a driving force. That has the effect, in particular, of compensating for the increased driving resistance to the extent that the vehicle coasts over a longer distance or with a reduced drop in speed.

Increasing the electrical power of the electric generator when the vehicle actual speed is greater than the vehicle target speed advantageously causes an increase in the driving resistance. The electrical energy thereby obtained may, for example, be stored. Preferably, the electrical energy so generated may also be used for further electrical consumers of the vehicle for the purpose of consumption. Preferably, it may be provided that further electrical consumers of the vehicle are switched on. In particular, it may be provided that the electric generator is switched on when it has previously been switched off. In order to increase the electrical power it may be provided, in particular, that the generator is coupled to the drive train when the generator has previously been uncoupled from the drive train.

In accordance with a further embodiment, it may be provided that the start of coasting is calculated under an assumption that the vehicle is coasting in an overrun mode in which the vehicle driving machine is being dragged by the vehicle and in which the electrical power developed is less than or equal to a predetermined maximum power, so that, as the sole actions of automatic intervention, when the vehicle actual speed is less than the vehicle target speed the vehicle driving machine and the transmission device are uncoupled from one another and when the vehicle actual speed is greater than the vehicle target speed the electrical power of the electric generator is increased.

The expression "sole actions" means, in particular, that no further actions apart from the aforementioned actions are carried out in this embodiment. It is therefore exclusively the aforementioned actions that are carried out.

The aforementioned embodiment has the effect, in particular, that the coasting process does not become excessively long. This is advantageous especially on account of the fact that excessively long coasting processes are not acceptable to many drivers.

That means therefore, in particular, that in the aforementioned embodiment the generator may be switched on or the power may be increased when the vehicle actual speed is greater than the vehicle target speed. In the opposite case, that is to say, when the vehicle actual speed is less than the vehicle target speed, the vehicle driving machine is uncoupled from the transmission device or a power is lowered or reduced. By that combination of the two possible influencing strategies for increasing or for reducing the driving resistance during coasting it is possible for the coasting process to be influenced in both directions without driving energy being disadvantageously lost. The aforementioned embodiment is therefore particularly energy-efficient and brings about a marked reduction in consumption of driving energy, that is, in fuel consumption and/or in consumption of electrical energy. In that manner, an overall range of the vehicle is advantageously increased. In addition, there are advantageously, for example, fewer waste gas emissions, such as, for example, carbon dioxide and/or carbon monoxide, which brings about a reduction in climate-damaging emissions.

In accordance with another embodiment, it may be provided that, when the vehicle actual speed is less than the vehicle target speed, as an automatic intervention shifting to a higher gear compared with the instantaneous gear takes place.

In another embodiment, it may be provided that, when the vehicle actual speed is greater than the vehicle target speed, as an automatic intervention shifting to a lower gear compared with the instantaneous selected gear takes place.

That means therefore, in particular, that by shifting to a higher or lower gear a step-down or step-up gear ratio between vehicle driving machine and transmission device is changed, which advantageously increases a driving resistance upon shifting to a lower gear or reduces it upon shifting to a higher gear.

In another embodiment, it may be provided that the comparison includes a calculation during the coasting of the expected vehicle actual speed at which the vehicle will reach the route position, and wherein the expected vehicle actual speed is compared with the desired speed as the vehicle target speed. That means therefore, in particular, that in this case the vehicle actual speed is an expected vehicle actual speed at the route position. It is therefore the expected vehicle target speed that is calculated. That expected vehicle actual speed is compared with the desired speed which is the vehicle target speed at the route position. Depending on the comparison, that is, on whether the expected vehicle actual speed is greater or less than the desired speed, an appropriate action is then performed.

DETAILED DESCRIPTION

Hereinafter, the same reference numerals may be used for the same features.

Figure 1:
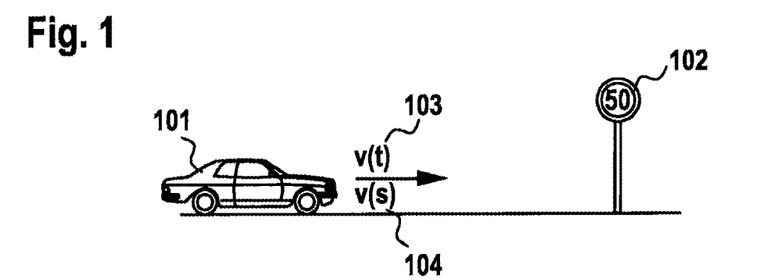
FIG. 1 shows coasting of a vehicle.

FIG. 1 show coasting of a vehicle 101.

Vehicle 101 is moving on a road, for example, at a speed of 100 km/h. Vehicle 101 is in this case moving, for example, toward a speed limit sign 102 showing a speed limit of 50 km/h. At the position of speed limit sign 102, vehicle 101 should therefore have a desired speed of 50 km/h. The vehicle target speed at that position should therefore be 50 km/h. The position of speed limit sign 102 is accordingly a route position of a driving route of vehicle 101 still to be travelled, at which position the desired speed is to be reached. That route position may also be referred to as a coasting event.

In this case, a speed curve of the vehicle may be described, for example, as a function of a time t, in this case marked as V(t) with reference numeral 103. The speed curve of vehicle 101 may preferably be described as a function of a distance s, in this case marked as V(s) with reference numeral 104.

In order to minimize, for example, consumption of a fuel or propellant and/or a consumption of electrical energy, it is sensible to reduce the vehicle speed by coasting in good time. Preferably, a hydraulic brake is not actuated during coasting.

Figure 2:
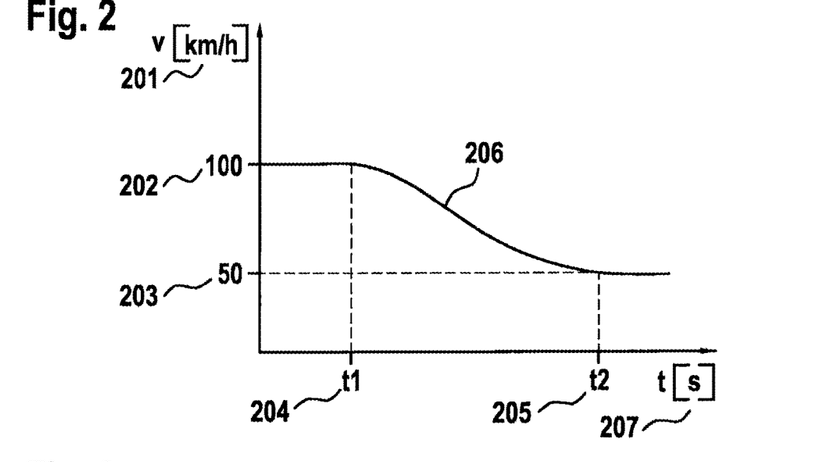
FIG. 2 shows a calculated curve of a vehicle target speed as a function of a time.

FIG. 2 shows a calculated curve of a vehicle target speed as a function of a time t in seconds.

A vehicle speed 201 is plotted on the ordinate in km/h. Time t 207 is plotted on the abscissa in seconds. At time t equals 0, the vehicle has a vehicle speed 202, also referred to as an initial speed, of 100 km/h and is to coast optimally to the desired speeds or rather target speed 203 of 50 km/h in accordance with traffic limit sign 102 in FIG. 1. For that purpose, in particular, a driving power is to be removed or reduced or set to zero at the correct time t1 204. As a rule, the theoretical vehicle actual speed over time then describes an exponential coasting curve 206 and usually meets target speed 203 of 50 km/h at time t2 205 at which vehicle 101 passes speed limit sign 102 shown in FIG. 1. The theoretically calculated curve 206 gives then, in particular, the vehicle target speed with which a vehicle actual speed is compared. Preferably, the theoretical curve may also be recalculated dynamically, especially constantly recalculated dynamically, during coasting, so that updated expected vehicle actual speed curves at the location of coasting event 102 are advantageously calculated, the expected vehicle actual speed at the location of coasting event 102 then being compared with the desired speed (target speed) at coasting event 102 (50 km/h in the example of FIG. 1 and FIG. 2).

Figure 3:
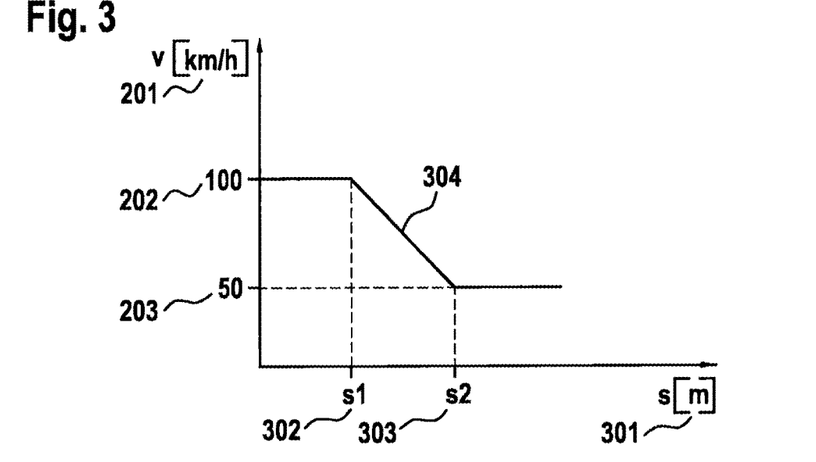
FIG. 3 shows a calculated curve of a vehicle target speed as a function of a distance to the route position.

FIG. 3 shows a calculated curve of a vehicle speed as a function of a distance s.

Vehicle speed 201 is plotted on the ordinate in km/h per hour. The distance s covered by the vehicle is plotted on the abscissa in meters and is marked by reference numeral 301. The coasting process, that is, the start of coasting, is initiated at a location S1 bearing reference numeral 302. Vehicle 101 reaches the target speed or desired speed of 50 km/h at a location S2 bearing reference numeral 303. Location S2 should ideally correspond to the position of speed limit sign 102. A coasting speed curve of an ideal vehicle with dragging engine is normally to a first approximation a straight line 304. That straight line 304 thus characterizes the theoretical curve of the vehicle actual speed and therefore forms the curve of a vehicle target speed with which the vehicle actual speed is compared. Analogously to the remarks made concerning FIG. 2, theoretical curve 304 may also be recalculated dynamically, especially constantly recalculated dynamically, during coasting, so that an expected vehicle actual speed at location S2 of the coasting event is then compared with the vehicle target speed at that location (in the example 50 km/h).

Depending on the position of speed limit sign 102, on an initial speed of vehicle 101, on the course of a route, on vehicle parameters, on calculated curves 206 and/or 304 and/or on further external vehicle environment parameters, optimum coasting start position S1 bearing reference numeral 302 or optimum coasting start time t1 bearing reference numeral 204 is calculated.

Figure 4:
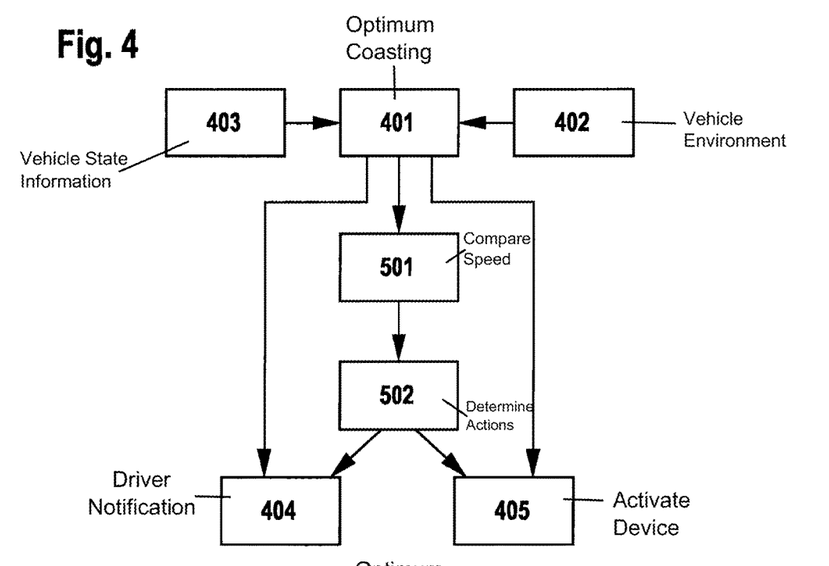
FIG. 4 shows a flow diagram of a method for operating a vehicle.

FIG. 4 shows a flow diagram of a method for operating a vehicle, which is able to render possible such a calculation.

In a step 401, optimum coasting start time 204 or optimum coasting start position 302, for example, is calculated. For this, an item of information about a vehicle environment is preferably made available beforehand in a step 402. That may be carried out, for example, by a navigation system including a digital map. The digital map normally contains speed-limiting elements, such as, for example, speed limit sign 102, and ascending and descending road gradients. In accordance with one embodiment, it may be provided that the navigation system is disposed in the vehicle. In a further embodiment, it may be provided that the navigation system communicates with the vehicle or the device by a wireless interface via an external server.

Before step 401, an item of information about the vehicle state may preferably be provided in a step 403. A vehicle state may include, for example, a current vehicle speed, a state of the gear mechanism and/or a position of the vehicle. The aforementioned items of information may, for example, be detected and made available by vehicle sensors, such as, for example, a GPS receiver, speed sensors on the brake, and sensors in the gear mechanism.

Using the aforementioned items of information ascertained and made available in steps 403 and 402, it is then possible to determine in step 401 an optimum coasting start time 204 and/or an optimum coasting start position 302. When vehicle 101 reaches coasting start time 204 or coasting start position 302, there may be issued to the driver in accordance with a step 404, for example, a notification that he must now take his foot off the accelerator pedal or must not ask for any further driving power. In addition or alternatively to step 404, it may be provided that, in a step 405, a device for operating a vehicle is activated, which device automatically initiates or starts the coasting. That means therefore, in particular, that a possible request for driving power on the part of the driver is then automatically ignored. The vehicle may, for example, be automatically operated in a freewheeling mode or an overrun mode.

In step 404, it may be provided that the notification is issued with the aid of a graphical display in an instrument cluster. In accordance with step 404, it may preferably be provided that haptic feedback is issued to the driver, for example a pulse at the driving pedal.

In accordance with step 405, it may be provided that the device for operating a vehicle is included in an automatic speed-regulating device which undertakes an automatic target speed reduction corresponding to the pre-calculated curves shown in FIG. 2 and FIG. 3.

In reality, however, coasting curves 206 and 304 are subject to a large number of influences which it is not possible to calculate in advance in step 401. An example of these is the effect of air movement. That is not normally known by the vehicle. A strong tail wind or head wind, for example gusts, may have a marked effect on the coasting process. A further example is errors in the navigation database of the navigation system in accordance with step 402. Ascending or descending gradients have a decisive effect on the course of the coasting curve. Although it is possible for that information to be made available via a navigation system, the data may contain errors.

It is also possible for errors to result from vehicle sensors, such as in the case of GPS-based positioning in accordance with step 403, for example owing to satellite shading or multipath reception.

It is therefore proposed that constant monitoring of the coasting process be carried out between a first coasting notification, that is, the issuing of the notification or the automatic intervention in the vehicle guidance in order to switch the vehicle to a freewheeling mode or an overrun mode, at time 204 or at position 302 and the reaching of the coasting event, time t2 bearing reference numeral 205 or distance position S2 bearing reference numeral 303, and that corrective measures be carried out in the event of deviations.

Figure 5:
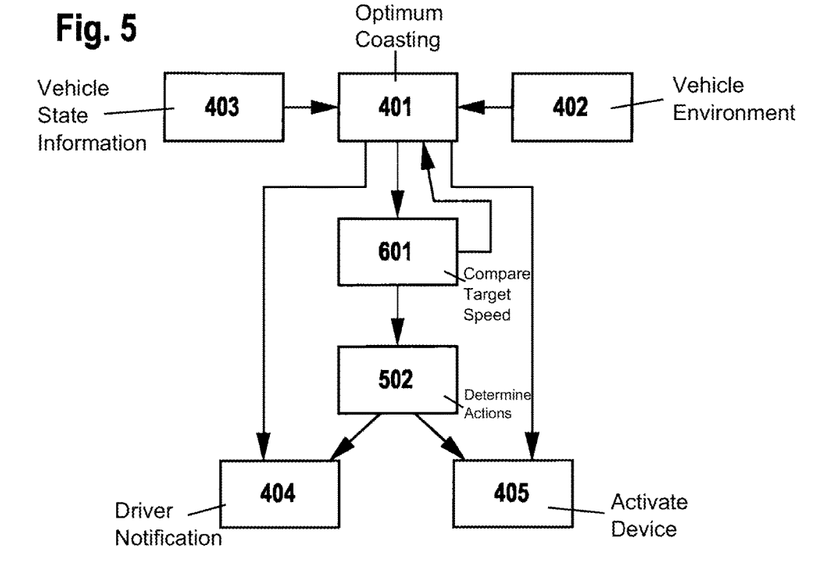
FIG. 5 shows a flow diagram of a further method for operating a vehicle.

In accordance with the flow diagram in FIG. 5, two further method steps 501 and 502 are provided in that respect. In method step 501, a vehicle actual speed is compared at a time t and/or at a location s with a corresponding vehicle target speed of curve 206 shown in FIG. 2 or of curve 304 shown in FIG. 3, respectively. It is therefore advantageously verified whether vehicle 101 is coasting in accordance with pre-calculated curves 206 and 304.

If it is ascertained in step 501 that a deviation occurs, that is to say, that a vehicle actual speed is greater or less than a corresponding vehicle target speed at the same location or at the time based on the two coasting curves 206 and 304, then actions that may include corrective measures are determined in accordance with a step 502. For example, a notification may be issued to the driver in the form of recommendations. That is communicated in step 404. In addition, those corrective measures may be implemented in accordance with step 405 by the device for operating vehicle 101.

To ascertain whether a deviation has occurred, it may preferably be provided in step 501 that a speed difference be found. For that purpose, the target coasting curve $v_{target}(t)$ 206 or $v_{target}(s)$ 304 calculated in method step 401 is used. In method step 501, that curve is constantly compared with the effective vehicle speed, that is, the vehicle actual speed, $v_{actual}(t)$ at time t or $v_{actual}(s)$ at location s. The resulting speed difference $v_{difference}(t)=v_{actual}(t)-v_{target}(t)$ or $v_{difference}(s)=v_{actual}(s)-v_{target}(s)$ may be used in the further method step 502 to determine corrective measures which are turned into reality in steps 404 and 405.

If the speed difference $v_{difference}(t)$ or $v_{difference}(s)$ assumes a negative value, then the driving resistances are assumed to be higher than originally in method step 401 (for example owing to a head wind due to a strong gust of wind or owing to an unforeseen ascending gradient due to errors in the navigation database). In method step 502, corrective measures are then determined to reduce the driving resistance during the coasting process. Especially advantageous embodiments, which may be provided individually or in combination, in the case of a coasting vehicle are:
1. reducing the driving resistance by using an electric generator, especially a closed-loop controlled electric generator. That may be either a normal 14V generator and/or a generator, especially a very powerful generator, of a regenerative start/stop system. In this case, any generator operating is shut down or its power output is reduced in order to lower the driving resistance. All other electric generators, such as, for example, drive motors of a hybrid vehicle or electric vehicle operating in regenerative mode, are also suitable for this purpose.
2. reducing the driving resistance by shifting to a higher gear (for example shifting from fifth to sixth gear).
3. reducing the driving resistance by uncoupling or disconnecting the engine or the vehicle driving machine from the drive train, that is, in particular, from the driving wheels, (especially for initiating a freewheeling phase after a preceding drag phase).
4. In a boosting regenerative start/stop system, the generator may preferably also be switched over to boost mode in order to partially compensate for the overall driving resistance using electric drive.

If the speed difference $v_{difference}(t)$ or $v_{difference}(s)$ assumes a positive value, then the driving resistances are assumed to be lower than originally in method step 401 (for example owing to a tail wind due to a strong gust of wind or owing to an unforeseen descending gradient due to errors in the navigation database). In method step 502, corrective measures are then determined to increase the driving resistance during the coasting process. Especially advantageous embodiments, which may be provided individually or in combination, in the case of a coasting vehicle are:
1. increasing the driving resistance by using an electric generator, especially a closed-loop controlled electric generator. That may be either a normal 14V generator and/or an electric generator, preferably a very powerful generator, of a regenerative start/stop system. In this case, any generator not operating in the coasting phase is switched on or its power output is increased in order to increase the driving resistance. All other electric generators, such as, for example, drive motors of hybrid vehicles or electric vehicles operating in regenerative mode, may also be used for this purpose.
2. increasing the driving resistance by shifting to a lower gear (for example shifting from sixth to fifth gear).
3. increasing the driving resistance by coupling the engine or the vehicle driving machine to the drive train, that is, in particular, to the driving wheels, (especially for initiating a drag phase after a preceding freewheeling phase).
4. temporarily activating a retarder in a vehicle, especially in a heavy commercial vehicle.

The following embodiment is especially advantageous: so that the coasting processes do not become too long (long coasting processes are generally not acceptable to many drivers), calculation of the coasting process is always carried out with dragging engine, but without regenerative generator drive (or with regenerative generator operation at low regeneration power). If the current vehicle speed, that is, the instantaneous vehicle actual speed, deviates upwardly from the pre-calculated coasting speed (driving resistance too low), regenerative generator operation may be switched on or the regeneration power may be increased, the driving resistance rises. If the current driving speed, that is, the instantaneous vehicle actual speed, deviates downwardly from the pre-calculated coasting speed (driving resistance too high), the engine is disconnected from the drive train (initiation of a freewheeling phase). By combination of those two possible influencing strategies for raising or lowering the driving resistance during coasting it is possible to influence the coasting process in both directions without driving energy being lost.

FIG. 5 shows a flow diagram of a further method for operating a vehicle.

In this case, method step 501 described above and shown in FIG. 4 is changed into a method step 601. In detail, it is provided that coasting curves 206 and/or 304 calculated in accordance with step 401 are updated at least once and preferably several times, that is to say, in particular, continuously. There takes place, therefore, a re-calculation, especially a more or less frequent re-calculation, of curves 206 and/or 304. In step 601, the target speed at which the vehicle is expected to arrive at coasting event 102 is then compared. To that extent, the vehicle actual speed is in this case an expected vehicle actual speed. If the expected vehicle actual speed at the coasting event, that is, at the route position, deviates from the desired target speed, that is, the desired speed, the measures described above in connection with FIG. 4 for raising or lowering the driving resistance during the coasting process are determined again in step 502. It may preferably be provided, therefore, that no comparison of the current or instantaneous vehicle actual speed with a vehicle target speed calculated in a coasting curve takes place, but a comparison of the expected vehicle actual speed at the coasting event, that is, at the route position, with the desired target speed at the coasting event, that is, with the desired speed, takes place.

Figure 6:
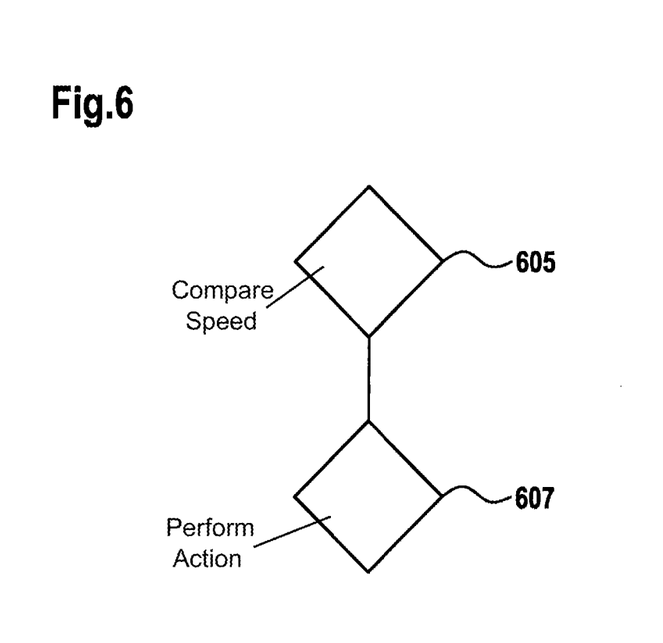
FIG. 6 shows a flow diagram of another method for operating a vehicle.

FIG. 6 shows a flow diagram of another method for operating a vehicle.

In accordance with a step 605, during coasting of the vehicle, in order to reach a route position of a route still to be travelled, at a desired speed that is less than a vehicle speed at the start of coasting, a vehicle actual speed is compared with a vehicle target speed. In accordance with a step 607, an action is performed in dependence on the comparison.

Figure 7:
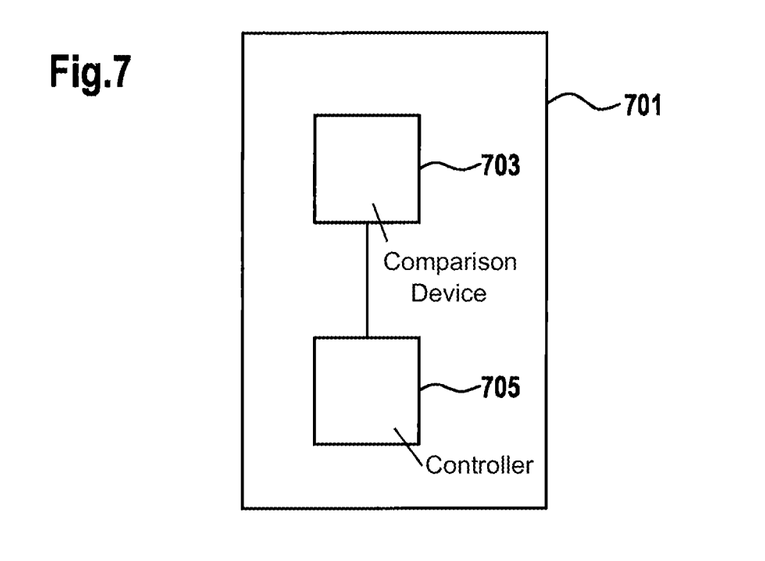
FIG. 7 shows a device for operating a vehicle.

FIG. 7 shows a device 701 for operating a vehicle (not shown).

Device 701 includes a comparison device 703 which is configured to compare a vehicle actual speed with a vehicle target speed during coasting of the vehicle in order to reach a route position of a driving route that is still to be travelled, at a desired speed that is less than a vehicle speed at the start of coasting. Device 701 further includes a controller 705 for controlling an action in dependence on the comparison.

What is claimed is:
1. A method for operating a vehicle, comprising:
during a coasting of the vehicle:
determining a vehicle actual speed;
comparing the vehicle actual speed with a vehicle target speed; and
reducing a difference between the vehicle actual speed and the vehicle target speed based on the comparison by performing an action in dependence on the comparison, wherein the action includes an automatic intervention in a vehicle operation in order to reach a route position at a desired speed,
wherein, when the vehicle actual speed is less than the vehicle target speed, as an automatic intervention an electrical power developed by an electric generator that is coupled to a drive train of the vehicle is reduced, and wherein, when the vehicle actual speed is greater than the vehicle target speed, as an automatic intervention the electrical power of the electric generator is increased; and calculating a start of the coasting under an assumption that the vehicle is coasting in an overrun mode in which the vehicle driving machine is being dragged by the vehicle and in which the electrical power developed is less than or equal to a predetermined maximum power, so that, as the sole actions of automatic intervention, when the vehicle actual speed is less than the vehicle target speed the vehicle driving machine and the transmission device are uncoupled from one another, and when the vehicle actual speed is greater than the vehicle target speed the electrical power of the electric generator is increased.

2. The method as recited in claim 1, wherein the action includes issuing a notification for a corrective measure in order to reach a route position at a desired speed.

3. The method as recited in claim 1, wherein, when the vehicle actual speed is less than the vehicle target speed, as an automatic intervention a vehicle driving machine and a transmission device for transmitting a driving force developed by the vehicle driving machine to a vehicle environment for movement of the vehicle are uncoupled from one another, and wherein, when the vehicle actual speed is greater than the vehicle target speed, as an automatic intervention the vehicle driving machine and the transmission device are coupled to one another.

4. The method as recited in claim 1, wherein:

when the vehicle actual speed is less than the vehicle target speed, as an automatic intervention a shifting to a higher gear takes place, and when the vehicle actual speed is greater than the vehicle target speed, as an automatic intervention a shifting to a lower gear takes place.

5. The method as recited in claim 1, wherein:

the comparison includes a calculation during the coasting of an expected vehicle actual speed at which the vehicle will reach a route position, and the expected vehicle actual speed is compared with a desired speed as the vehicle target speed.

6. The method as recited in claim 1, wherein:

determining the vehicle actual speed comprises determining the vehicle actual speed that accounts for interference to the coasting of the vehicle caused by the environment; and reducing the difference between the vehicle actual speed and the vehicle target speed comprises reducing an impact of the interference on the coasting of the vehicle.

7. A device for operating a vehicle, comprising:

a comparison device configured to determine a vehicle actual speed during a coasting of the vehicle and to compare the vehicle actual speed with a vehicle target speed during the coasting of the vehicle in order to reach a route position of a driving route that is still to be travelled, at a desired speed that is less than a vehicle speed at a start of coasting; and a controller configured to reduce a difference between the vehicle actual speed and the vehicle target speed during the coasting of the vehicle based on the comparison by performing an automatic intervention in a vehicle operation in order to reach a route position at a desired speed, wherein, when the vehicle actual speed is less than the vehicle target speed, as an automatic intervention the controller reduces an electrical power developed by an electric generator that is coupled to a drive train of the vehicle, and wherein, when the vehicle actual speed is greater than the vehicle target speed, as an automatic intervention the controller increases the electrical power of the electric generator, wherein the device for operating the vehicle is configured to calculate a start of the coasting under an assumption that the vehicle is coasting in an overrun mode in which the vehicle driving machine is being dragged by the vehicle and in which the electrical power developed is less than or equal to a predetermined maximum power, so that, as the sole actions of automatic intervention, when the vehicle actual speed is less than the vehicle target speed the vehicle driving machine and the transmission device are uncoupled from one another, and when the vehicle actual speed is greater than the vehicle target speed the electrical power of the electric generator is increased.

8. A non-transitory computer program including program code for carrying, when the computer program is executed on a computer, a method for operating a vehicle, comprising:

during a coasting of the vehicle:

determining a vehicle actual speed;

comparing the vehicle actual speed with a vehicle target speed; and reducing a difference between the vehicle actual speed and the vehicle target speed based on the comparison by performing an action in dependence on the comparison, wherein the action includes an automatic intervention in a vehicle operation in order to reach a route position at a desired speed, wherein, when the vehicle actual speed is less than the vehicle target speed, as an automatic intervention an electrical power developed by an electric generator that is coupled to a drive train of the vehicle is reduced, and wherein, when the vehicle actual speed is greater than the vehicle target speed, as an automatic intervention the electrical power of the electric generator is increased; and calculating a start of the coasting under an assumption that the vehicle is coasting in an overrun mode in which the vehicle driving machine is being dragged by the vehicle and in which the electrical power developed is less than or equal to a predetermined maximum power, so that, as the sole actions of automatic intervention, when the vehicle actual speed is less than the vehicle target speed the vehicle driving machine and the transmission device are uncoupled from one another, and when the vehicle actual speed is greater than the vehicle target speed the electrical power of the electric generator is increased.

* * * * *